No. 703,190. Patented June 24, 1902.
B. A. GEURINK.
PRESS FOR EXPRESSING JUICE FROM FRUIT OR OTHER MATERIAL.
(Application filed Dec. 26, 1901.)
(No Model.) 2 Sheets—Sheet 1.
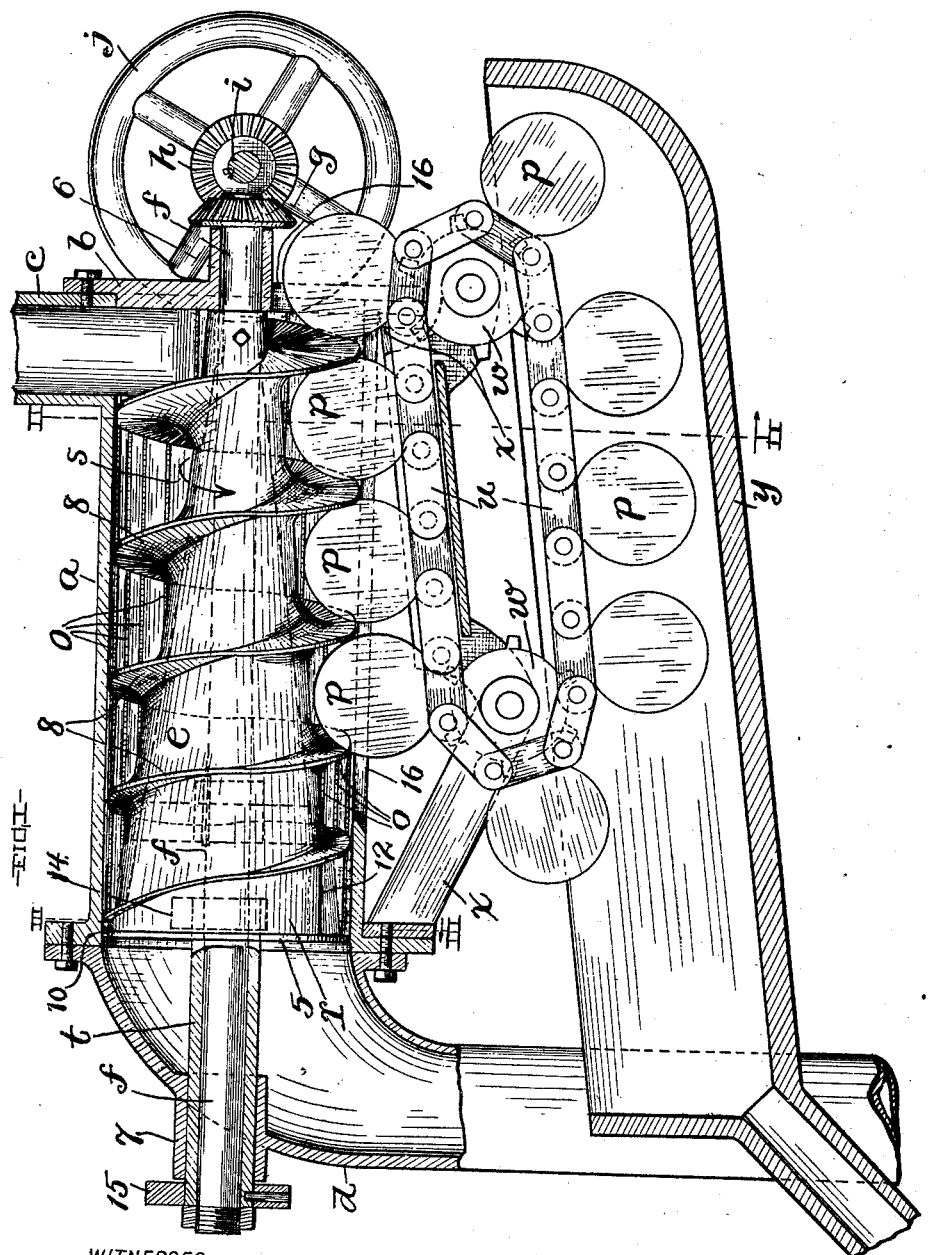
WITNESSES:
Daniel E Daly.
Victor C. Lynch.
INVENTOR
Bernard A. Geurink
BY
his ATTORNEYS

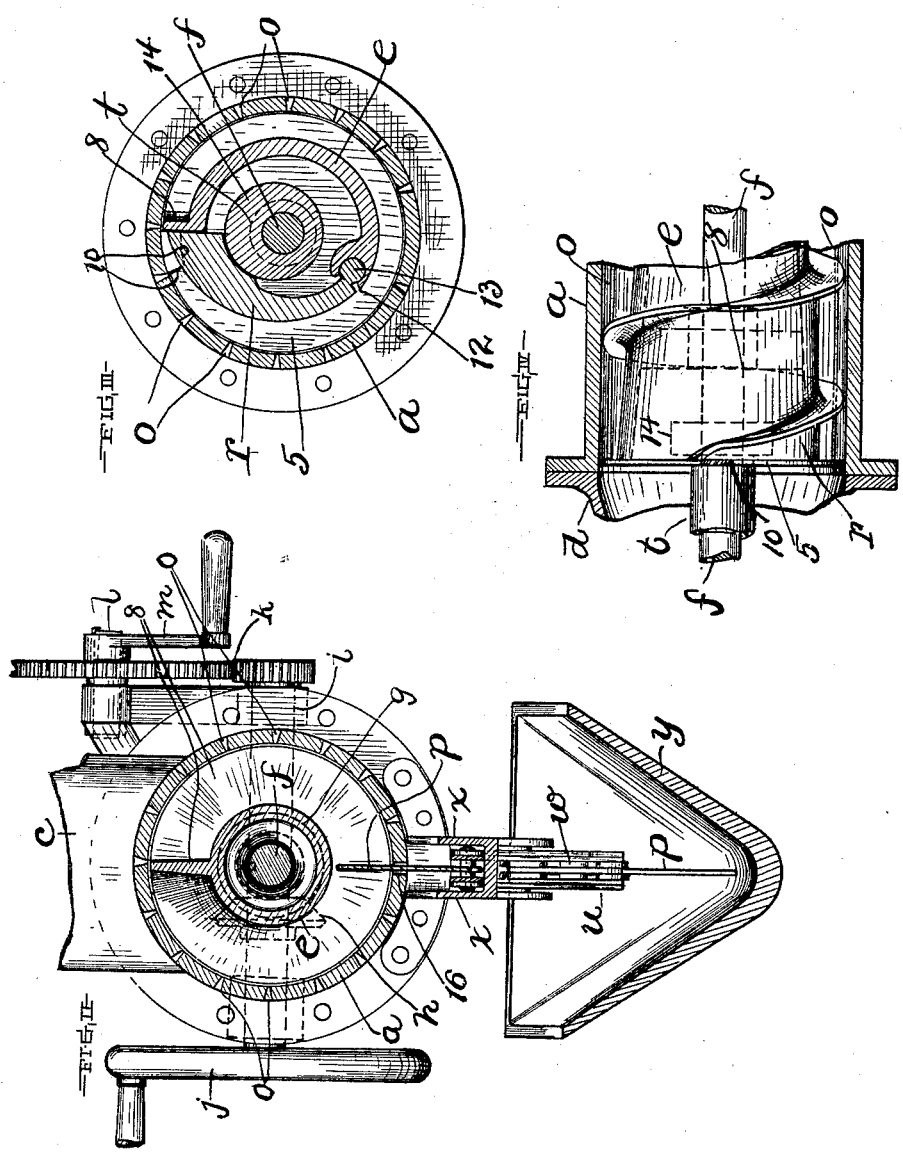

UNITED STATES PATENT OFFICE.

BERNARD A. GEURINK, OF CLEVELAND, OHIO.

PRESS FOR EXPRESSING JUICE FROM FRUIT OR OTHER MATERIAL.

SPECIFICATION forming part of Letters Patent No. 703,190, dated June 24, 1902.

Application filed December 26, 1901. Serial No. 87,228. (No model.)

*To all whom it may concern:*

Be it known that I, BERNARD A. GEURINK, a citizen of the United States of America, residing at Cleveland, in the county of Cuyahoga and State of Ohio, have invented certain new and useful Improvements in Presses for Expressing Juice from Fruit or other Material; and I hereby declare the following to be a full, clear, and exact description of the invention, such as will enable others skilled in the art to which it pertains to make and use the same.

My invention relates to improvements in presses suitable for use in expressing juice from fruit and other juice-yielding material.

The primary object of this invention is to construct a light portable press, more especially well adapted for use as a wine-press, which can be operated with facility.

With this object in view and to the end of realizing other advantages hereinafter appearing the invention consists in certain features of construction and combinations of parts hereinafter described, and pointed out in the claims.

In the accompanying drawings, Figure I is a side elevation of the press largely in central longitudinal section. Fig. II is a transverse vertical section on line II II, Fig. I, looking in the direction indicated by the arrow. Fig. III is a transverse vertical section on line III III, Fig. I, looking in the direction indicated by the arrow. Fig. IV is a view of the rear end of the material-conveying and juice-expressing screw and shows the adjacent portion of the inclosing case in section.

Referring to the drawings, $a$ designates a horizontally-arranged cylindrical case which is uniform transversely from end to end. The case $a$ at its forward end is closed by a suitably-applied head $b$. The case $a$ is provided at its forward end with a feed-hopper $c$, which communicates in the usual manner with the forward or receiving end of the chamber of the said case. The case $a$ at its rear and discharging end is provided with a discharge-spout $d$.

A screw conveyer is arranged within and extends from end to end of the chamber of the case $a$. The said conveyer has a barrel or tubular core or body $e$, embracing and operatively connected with a shaft $f$, which is arranged horizontally and extends centrally and horizontally through the case $a$. The shaft $f$ extends through and forwardly of the head $b$ a suitable distance, and forward of the said head (see Figs. I and II) is operatively provided with a bevel-gear $g$, which meshes with a bevel-gear $h$, operatively mounted upon a suitably-supported shaft $i$, which is operatively provided with a hand-wheel $j$ and is arranged horizontally and at right angles to the shaft $f$. The shaft $i$ is suitably intergeared, as at $k$, with a shaft $l$, which (see Fig. II) is suitably supported and arranged parallel with the shaft $i$ and operatively provided with a crank $m$. Obviously, therefore, the shaft $f$, and consequently the screw conveyer, is upon turning the hand-wheel $j$ or the crank $m$ in the required direction driven in the direction required to cause the said conveyer to convey any material received within the case $a$ from the hopper $c$ toward the rear and discharging end of the case. The shaft $f$ extends through the rear end of the case $a$ and through the upper or receiving portion of the spout $d$. The head $b$ is provided with a box 6, which affords bearing to the forward end of the shaft $f$, and the spout $d$ is provided with a box 7, instrumental in supporting the rear end of the shaft $f$.

The core or body $e$ of the screw conveyer is conical, being gradually enlarged diametrically from its forward end adjacent the inner side of the head $b$ toward its rear and discharging end within the rear end of the case $a$. The core or body $e$ is provided at its rear extremity with a circular rim 5, which snugly but easily fits within the correspondingly-shaped chamber of the case $a$. The conveyer has one continuous thread 8, which is formed upon and integral with the core or body $e$ and coils around the said body or core between the ends of the conveyer. All the convolutions of the thread 8 are uniform or approximately uniform in external diameter, so that the thread has the greatest depth along its extreme forward convolution and gradually decreases in depth toward the rear end of the conveyer. Hence a continuous channel is formed between the convolutions of the thread 8 and extends spirally around the core or body from the rear end to the forward end of the conveyer and has the least depth at the rear end of the conveyer and gradually increases in depth toward the forward end of the conveyer.

By the relative form and arrangement of the case *a* and the screw conveyer hereinbefore described the juice-yielding material supplied to the forward and deepest end of the spirally-extending channel of the conveyer by the hopper *f* is upon rotating the conveyer in the required direction not only conveyed toward the rear end of the case *a*, but has the juice expressed therefrom during its rearward passage, and the juice thus expressed from the said material flows from within the case *a* laterally through juice-discharging slots, apertures, or passage-ways *o*, with which the case *a* is provided at short intervals circumferentially of the case. The gradual reduction of the channel of the screw conveyer toward the rear and discharging end of the said conveyer by a gradual enlargement of the core or body of the said conveyer toward the said end not only results in the compression of the juice-yielding material conveyed rearwardly by the conveyer, but gives to the conveyer a much greater juice-expressing capacity than would be the case if the core or body of the conveyer were cylindrical or reduced diametrically toward the rear and discharging end of the conveyer.

The rim 5 of the screw conveyer is provided in its periphery with a lateral perforation or aperture 10, which establishes open relation between the spiral channel of the said conveyer and the discharge-spout *d* and constitutes, therefore, the outlet of the said channel.

A valve *r*, which is capable of oscillation, is suitably supported from the core or body *e* of the screw conveyer and is arranged as required to render it capable of more or less partially closing the aperture 10, and consequently regulates the discharge of the residue by the conveyer into the spout *d*. Preferably the screw conveyer is recessed or cut away at its rear end, as at 12, circumferentially of the core or body *e* of the said conveyer to accommodate the location and operation of the valve *r*, which is arranged concentrically of the shaft *f* and has a journal 13 at one end, which journal has bearing in the said core or body *e* and is arranged with its axis longitudinally of the conveyer. The arrangement of the parts is such, therefore, that the valve *r* is capable of being swung laterally of the shaft *f* from or toward the shaft, and the aperture 10 is partially closed more or less, according as the said valve is swung from or toward the shaft.

The means for operating the valve *r* comprises, preferably, a cam 14, which affords bearing for the free end of the valve *r* and is formed upon the inner end of a tubular shaft *t*, which embraces and affords bearing to the rear end of the shaft *f* and extends through and has bearing in the box 7, and obviously the said valve is swung from or toward the shaft *f* by turning the cam-shaft *t* in the direction and to the extent required. The shaft *t* is operatively provided at the outer end of the said box 7 with a hand-wheel 15 for turning the shaft, and obviously the valve *r* is adjusted as required by properly manipulating the wheel *b*. It will be observed, therefore, that the valve *r* is normally free to swing laterally, but that the material conveyed to and under compression between the outer surface of the valve *r* and the opposing wall of the chamber of the case *a* during the operation of the press will retain the said valve against the engaging cam.

An important feature of my invention consists in means employed for preventing a return or backward movement of the material being conveyed and compressed by the screw conveyer during the operation of the conveyer, and my improved means for thus avoiding impediment to the conveyance of the material while the material is being compressed comprises a series of movable partitions or followers *p*, arranged to extend into and transversely of the spiral channel of the screw conveyer and movable by the thread of the conveyer edgewise and longitudinally of the conveyer during the operation of the conveyer toward the discharging end of the conveyer.

The arrow *s* in Fig. I indicates the direction in which the conveyer rotates during its operation.

The partitions or followers *p* are attached to and arranged at suitable intervals longitudinally of an endless chain or carrier *u*, engaging sprocket-wheels *w*, supported from brackets *x*, which are attached to the case *a*. The case *a* is slotted, as at 16, to accommodate the location and operation of the partitions or followers *p*.

A trough *y* is arranged to receive the juices expressed from the material operated upon within the case *a*.

What I claim is—

1. In a press of the character indicated, the combination with a case having juice-discharging apertures or passage-ways, and a screw conveyer arranged within and longitudinally of the case and having the channel formed between the convolutions of the thread of the conveyer discharging at the rear end of the case, of a valve for regulating the discharge of material at the rear and discharging end of the conveyer, which valve is borne by the conveyer, and means for operating the valve.

2. In a press of the character indicated, the combination with a cylindrical case having juice-discharging apertures or passage-ways, and a screw conveyer arranged within and longitudinally of the case and provided, at its discharging end, with a circular rim snugly but easily fitting within the surrounding case and provided with a discharging-aperture communicating with the channel formed between the convolutions of the thread of the conveyer, of a valve carried by the conveyer and arranged as required to render it capable of more or less closing the said aperture, and means for operating the valve.

3. In a press of the character indicated, the combination with a cylindrical case having juice-discharging apertures or passage-ways, and a screw conveyer arranged within and longitudinally of the case and provided, at its discharging end, with a circular rim which snugly but easily fits within the surrounding case and has a discharging-aperture communicating with the channel formed between the convolutions of the thread of the conveyer, of a valve journaled in the core or body of the conveyer so as to render it capable of movement from and toward the said body or core, which valve is arranged as required to render it capable of more or less closing the said aperture, and means for operating the valve, and the said body or core being cut away to accommodate the location and operation of the said valve.

4. In a press of the character indicated, the combination with a cylindrical case having juice-discharging apertures or passage-ways, a shaft extending centrally and longitudinally through the said case, a screw conveyer operatively mounted upon the said shaft and provided, at its discharging end, with a circular rim which snugly but easily fits within the surrounding case and has a discharging-aperture communicating with the channel formed between the convolutions of the thread of the conveyer, of a valve carried by the conveyer and arranged as required to render it capable of more or less closing the said aperture, a tubular shaft embracing the first-mentioned shaft and having a cam for operating the said valve.

5. In a press of the character indicated, the combination, with a case having juice-discharging apertures or passage-ways, and a screw conveyer arranged within and longitudinally of the case, of a series of partitions or followers arranged to extend into and transversely of the channel formed between the convolutions of the thread of the conveyer and movable edgewise and longitudinally of the conveyer and adapted to be actuated by the said thread toward the rear and discharging end of the conveyer during the operation of the conveyer, and a suitably-applied endless carrier carrying the said partitions or followers, and the aforesaid case being slotted to accommodate the location and operation of the said partitions or followers.

Signed by me at Cleveland, Ohio, this 11th day of December, 1901.

BERNARD A. GEURINK.

Witnesses:
   C. H. DORER,
   TELSA SCHWARTZ.